D. Watson.
Harvester Cutter.
No. 16413                    Patented Jan. 13, 1857.
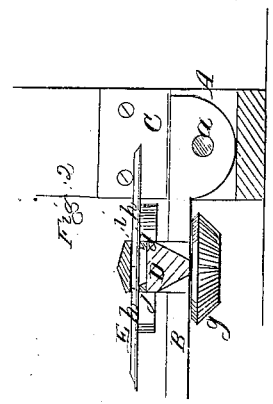
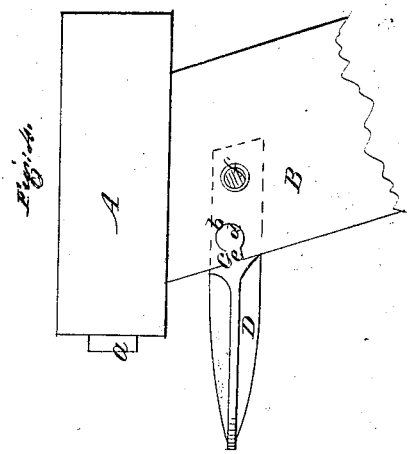
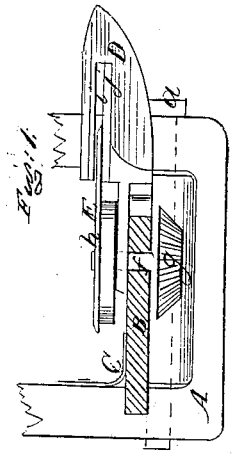
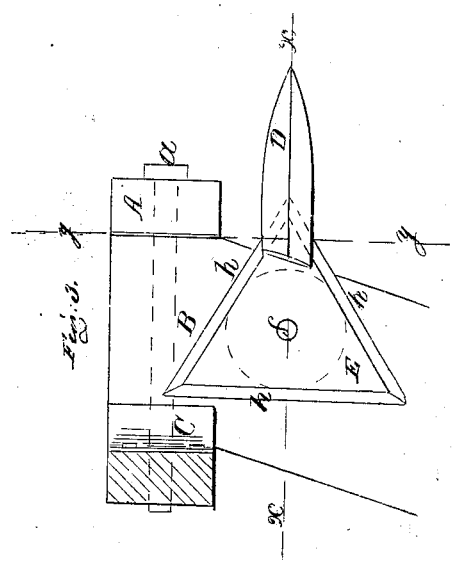

UNITED STATES PATENT OFFICE.

DAVID WATSON, OF NEWARK, NEW JERSEY.

IMPROVEMENT IN REAPING AND MOWING MACHINES.

Specification forming part of Letters Patent No. 16,413, dated January 13, 1857.

*To all whom it may concern:*

Be it known that I, DAVID WATSON, of Newark, in the county of Essex and State of New Jersey, have invented certain new and useful Improvements in Mowing and Reaping Machines; and I do hereby declare that the following is a full, clear, and exact description of the same, reference being had to the annexed drawings, making a part of this specification, in which—

Figure 1 is a side view of my improvement, the finger-bar being bisected transversely, as indicated by the line $x\ x$, Fig. 3. Fig. 2 is a front view of the same, the finger-bar being bisected transversely, as indicated by the line $y\ y$, Fig. 3. Fig. 3 is a plan or top view of the same. Fig. 4 is an inverted plan of the same, the driving-pinion being removed.

Similar letters of reference indicate corresponding parts in the several figures.

To enable those skilled in the art to fully understand and construct my invention, I will proceed to describe it.

A represents a metal hanger or stirrup, which is attached to the main frame of the machine; and B is the finger-bar, or, rather, a portion of said bar, the inner end of which is secured in the hanger or stirrup A by a bolt, $a$, which passes through the hanger and transversely through the finger. (See Figs. 1, 2, and 3.)

C represents a flat spring, which is attached to the hanger A, the said spring bearing upon the upper surface of the finger-bar. The finger-bar is allowed to work upon the bolt $a$, and the bar consequently will rise or fall to correspond to the inequalities of the ground, the spring C preventing the bar from rising casually.

D represents one of the fingers. Any proper number of fingers is used. The fingers are secured to the bar B by drilling holes $b$ through it near its front edge and cutting slots $c$ from said holes to the edge, as shown clearly in Fig. 4. The under portions of the back part of the fingers are cut with cylindrical and square portions $d\ e$, so that said portions may fit in the holes $b$ and slots $c$. (See Fig. 4.) By this means of attachment a dovetail connection is formed and the fingers are secured firmly to the bar, and with but a slight expense. Through the back part of the finger D a vertical shaft, $f$, passes, said shaft also passing through the finger-bar and having a bevel-pinion, $g$, on its lower end. The upper part of this shaft passes through the center of a triangular cutter, E, having three cutting edges or sides, $h\ h\ h$. The cutter E is attached permanently to the upper end of the shaft, or may be secured thereto by a nut. The angles of the cutter E, as the cutter rotates, work through a slot, $i$, in the finger D, and the lower edges of the slot $i$ are covered by strips $j$, of tin or other soft metal, so as to protect the cutting-edges of the cutter. (See Fig. 2.)

Any proper number of cutters may be used, and they are driven in any proper manner by suitable gearing connected with the bevel-pinions $g$.

The device which drives the rotary cutters is placed underneath the finger-bar, and consequently no obstruction is offered to the cut grass or grain as it passes over the finger-bar and cutters. The cutters, being of the shape or form described, act in the most effective manner upon the grass or grain, and are not liable to become choked or clogged. The finger-bar also is allowed to yield or conform to the inequalities of the ground, owing to its peculiar connection with the hanger A, and the grass or grain will be cut in an even manner.

It will be seen by reference to the spring $c$ that it is so attached to the stirrup A that while it is protected from the grass it answers the purpose of bringing back the cutter-bar into a horizontal position when from any cause the bar has deviated either above or below that line. It will also be seen that the spring extends beyond the center of the bolt on each side, and that as the action of the finger-bar in one direction tends to compress one side of the spring the action of the finger-bar in the other direction tends to bring it back into its original effective position. The spring, being curved, is easily adjusted by set-screws.

What I claim, and desire to secure by Letters Patent, is—

The use and application of the adjustable curved flat spring $c$ to the upper surface of the finger-bar B, when both are attached to the stirrup A for joint action in the manner and for the purposes described.

DAVID WATSON.

Witnesses:
J. F. BUCKLEY,
W. TUSCH.